United States Patent [19]
Orlandi

[11] Patent Number: 4,936,558
[45] Date of Patent: Jun. 26, 1990

[54] VARIABLE STRENGTH SPRING
[75] Inventor: Alfredo Orlandi, Vicolo Cortile, Italy
[73] Assignee: Pirelli Sistemi Antivibranti S.p.A., Milan, Italy
[21] Appl. No.: 364,497
[22] Filed: Jun. 9, 1989

Related U.S. Application Data
[63] Continuation of Ser. No. 155,031, Feb. 11, 1988, abandoned.

[30] Foreign Application Priority Data
Mar. 2, 1987 [IT] Italy .................. 19540A/87

[51] Int. Cl.⁵ .............................................. F16F 1/38
[52] U.S. Cl. ...................................... 267/292; 180/312;
180/902; 248/635; 248/638; 248/677; 280/716;
267/141.7; 267/153
[58] Field of Search ............... 267/140, 141, 141.1,
267/141.2, 141.3, 141.5, 141.7, 153, 257, 258,
292, 201; 180/312, 902; 280/716; 248/635, 638,
677

[56] References Cited
U.S. PATENT DOCUMENTS

| | | | |
|---|---|---|---|
| 2,069,270 | 2/1937 | Piron | 267/141.1 X |
| 2,117,264 | 5/1938 | Workman | 267/292 X |
| 2,242,212 | 5/1941 | Hankins | 267/292 |
| 2,245,296 | 6/1941 | Piron | 267/292 |
| 2,553,188 | 5/1951 | Grube | 267/258 |
| 3,037,764 | 6/1962 | Paulsen | 267/292 |
| 4,424,960 | 1/1984 | Dan et al. | 267/141 X |

FOREIGN PATENT DOCUMENTS

| | | | |
|---|---|---|---|
| 55068 | 6/1951 | France | 267/257 |
| 1434610 | 2/1966 | France | 267/257 |
| 890032 | 2/1962 | United Kingdom | 267/141 |

Primary Examiner—George E. A. Halvosa
Attorney, Agent, or Firm—Oblon, Spivak, McClelland, Maier & Neustadt

[57] ABSTRACT

A variable strength spring includes a tubular body, at whose inner surface is coaxially provided a concave contact seat, a ring made of elastomeric material rigidly engaged in the tubular body and a connection tang rigidly engaged in the elastic ring. The elastic ring has a radial groove that defines, on the longitudinal length of the ring, a first portion rigidly engaged inside the tubular body opposite the contact seat, and a second portion slidably engaged in the tubular body. On the outer circumferential end of the second portion is situated a rigid rabbet edge positioned opposite to a stopping seat inside the tubular body.

7 Claims, 1 Drawing Sheet

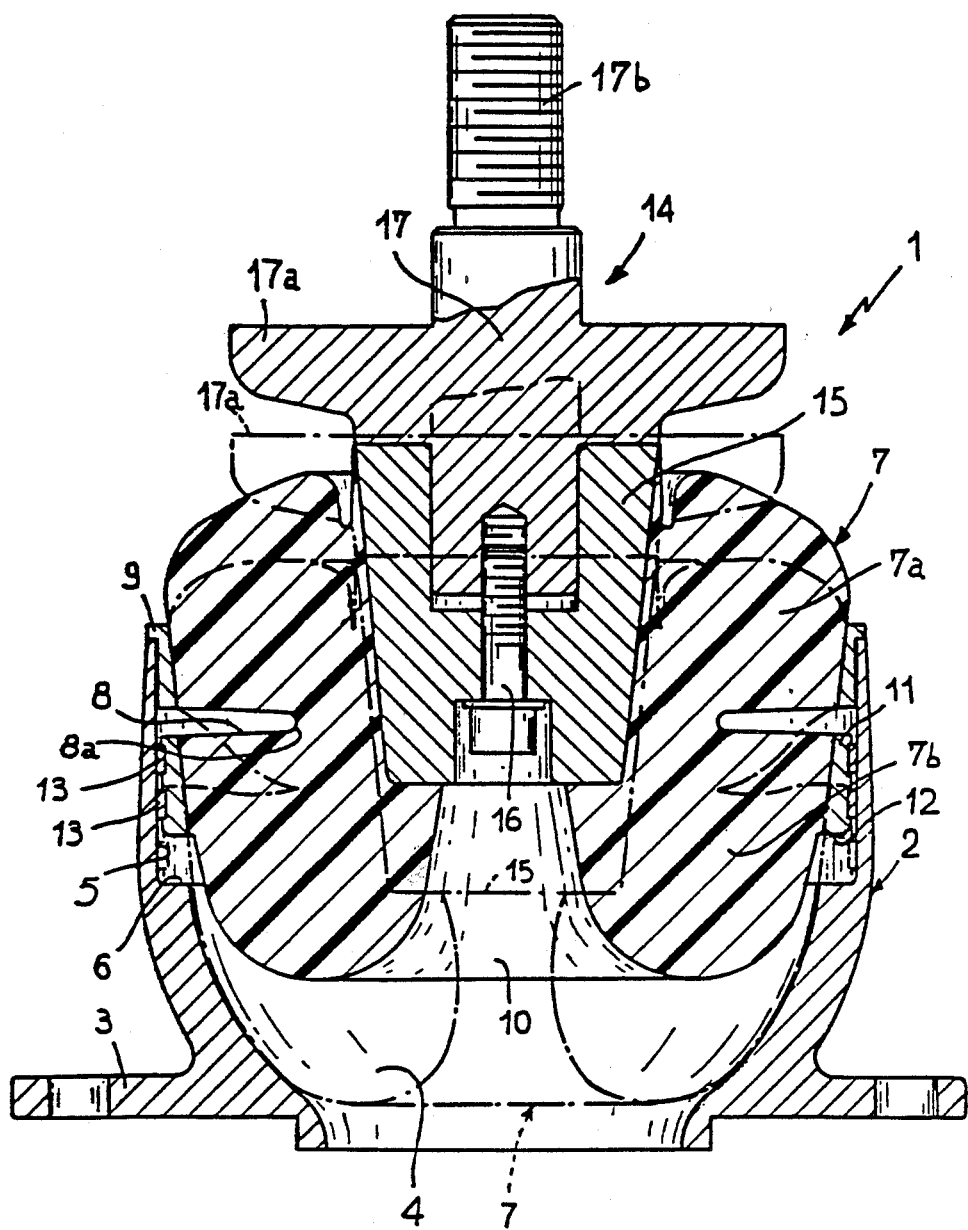

VARIABLE STRENGTH SPRING

This application is a Continuation of application Ser. No. 155,031, filed on Feb. 11, 1988, now abandoned.

BACKGROUND OF THE INVENTION

1. Field of the Invention:

The present invention relates to a variable strength spring, comprising a tubular body in which is situated a contact seat, concave and coaxial in respect to the tubular body, a ring made of elastomeric material coaxially engaged in the tubular body and having a checking surface turned towards said contact seat and a connection tang rigidly engaged in the elastic ring opposite the checking surface.

2. Background of the Related Art:

It is known that springs of said type are particularly suitable to be used in suspensions for transport vehicles, for example railway wagons which are required to support considerable variations of static load. Such springs must present, as an essential characteristic, a rigidity growing with the increase of static load to which they are asked to support.

Considering the behavior of suspensions in railway wagons, springs must present a relatively reduced rigidity when the wagon is unloaded (load acting on each spring equal to 800–900 kg., approximately) or when the transported load is of relatively low weight. This is a necessary condition to avoid, during running, undesirable disengagements between wheel and rail which might occur due to unavoidable unevenness, particularly in connection with junctions between rails. In conditions of a limited static load, a low strength of the spring is essential, also to avoid various impacts supported by wheels during running being entirely sent to the suspended mass.

Conversely, when the static load is of a considerable value (4200–4800 Kg.), springs must have a high strength, so that situation of static load variations does not produce excessive variations of spring flexure and, hence, excessive vertical movements of the vehicle center of gravity.

To satisfy these needs, springs which comprise essentially a shaped elastic ring are utilized; this shaped elastic ring is realized by elastomeric material of suitable rigidity, which is rigidly and coaxially engaged inside the tubular body.

The tubular body is shaped in order to present coaxially, at its interior, a concave contact seat connecting with a cylindric wall inside the tubular body. The contact seat is turned towards the elastic ring and is suitably spaced from the same.

The elastic ring is also rigidly engaged a connection tang, whose fastening portion protrudes from the ring on the side opposite to the contact seat.

In the assembly of the spring, the tubular body and the connection tang are respectively fixed to parts under relative movement, i.e. to the suspended mass and to the non-suspended mass of the vehicle, and vice versa. In such a situation the loads sent to the spring are opposed by the consequent elastic deformations of the ring.

Choosing suitable constructions for the various spring components, it it possible on confer to said spring a rigidity that within certain limits, grows with the static load increase.

When the conventional spring must support relatively reduced loads, the entire section of the deformable ring is substantially stressed by shearing stress. In such a situation the elastic ring is susceptible to deformations which are relatively high under the action of load variations and the spring shows a relatively low rigidity whose value remains substantially constant within certain limits of load. In these limits the elastic ring is deforming by moving in the tubular body without interferring with the contact seat in said tubular body. When the load increases beyond the above mentioned limits, the elastic ring, while deforming itself, goes progressively in contact, by its duly shaped checking surface with the above mentioned contact seat.

In such a situation, the elastic ring is also stressed to compression, with stresses increasing little by little while the contact surface inhibits further deformations. As a result there is a considerable increase of spring rigidity with increased load increase.

It is noted that known springs, although they allow rigidity variations with an increase of static load, have not shown, up to now, a fully satisfactory behavior.

As a matter of fact, as evident from the above, the rigidity of said springs is substantially subjected to increase with the increase of load, only after that same load has exceeded a predetermined value.

SUMMARY OF THE INVENTION

The main purpose of the present invention is of eliminating such drawback, realizing a spring also having variable strength when it must support relatively reduced loads.

This aim and others, which will now be better understood from the following detailed description, are substantially achieved by a variable strength spring, including a tubular body having an inside surface defining a concave contact seat coaxial to the tubular body and an elastic ring in the tubular body. The elastic ring has a checking surface facing the contact seat and a circumferential groove extending from an outer periphery of the ring towards the interior thereof, the groove being positioned along the length of the ring such that the groove longitudinally divides the ring into a first part located on a side of the groove opposite the contact seat, and a second part. The first part is fixed to the tubular body and the second part includes the checking surface and is slidable relative to the tubular body. Means are provided for defining a rigid rabbet edge movable with the outer periphery of the second portion and a connection tang is rigidly connected to the elastic ring. A stopping seat is positioned in the tubular bodies such that it is spaced from the rabbet edge when the spring is not subjected to a load, and such that movement of the rabbet edge due to flexure of the elastic ring in response to a load on the spring is stopped by the stopping seat.

BRIEF DESCRIPTION OF THE DRAWINGS

Further characteristics and advantages will be better shown from the following detailed description of a preferred but not exclusive execution of a variable strength spring, according to the present invention, described therein, with reference to the enclosed drawing, provided only for description and not limitative purposes, in which the single figure shows the spring in reference sectioned along a longitudinal median plane.

DETAILED DESCRIPTION OF THE PREFERRED EMBODIMENTS

With reference to the figure, 1 generally indicates a variable strength spring, according to the present invention.

The spring 1 includes a tubular body 2 of circular shape, provided with a connection flange 3 by which the tubular body 2 can be fixed to the non-suspended mass of a railway wagon.

Inside the tubular body is coaxially housed, at one end of the body, contact seat 4 and an inner cylindrical surface 5.

Between seat 4 and the inner cylindrical surface 5 is positioned a stopping seat 6, which extends radially inside tubular body 2, whose purpose will be described further on.

Inside tubular body 2 is coaxially engaged an elastic ring 7, made of elastomeric material of suitable rigidity, which is provided with a circumferential groove 8 radially extended from outside towards inside.

The groove 8 substantially divides the longitudinal length of elastic ring 7 in a first portion 7a and in a second portion 7b.

Considering a preferred embodiment, groove 8 is positioned on the longitudinal length of ring 7 so that the area of ring section 7 is equally divided between first portion 7a and the second portion 7b.

Preferably, the ratio value between the groove depth 8 and the elastic ring thickness 7, near the groove, is between 0.4 and 0.6. The groove width 8 is not of considerable importance to the suitable functioning of spring 1. It is however foreseen that groove 8 terminates, inside ring 7, at a suitable curved end 8a, to avoid regions of major vulnerability in which ruptures of elastic ring 7 might occur.

The first portion 7a is fastened to the tubular body 2 and is disposed on the opposite side to the seat 4. More precisely, the first portion 7a is fixed by a rubber-metal connection to a flange 9, which is, in turn, fastened to the tubular body 2.

The second portion 7b presents a suitably shaped check surface 10 turned towards the seat 4. The check surface 10 is outwardly provided with the annular rigid element 11, which is fastened to the contact seat 4 by a rubber-metal connection.

The annular element 11 is slidably engaged along the inner cylindrical surface 5 and presents a rigid rabbet edge 12 to the stopping seat 6. Rabbet edge 12 is normally spaced from said stopping seat by a predetermined distance.

It is also foreseen that between the annular element 11 and the inner cylindrical surface 5 of the tubular body 2 are interposed two or more sliding rings 13 made of low friction coefficient material.

The spring 1 also comprises a connection tang 14 which connects spring 1 to the suspended mass of a wagon; this connection tang is fixed inside the elastic ring 7.

The connection tang 14 is preferably constituted by a trunco-conic element 15 rigidly engaged inside the elastic ring 7 by a rubber-metal connection. Furthermore, the connection area between elastic ring 7 and the trunco-conic element 15 is substantially identical to the fastening area of first portion 7a to the flange 9 fixed to the tubular body 2.

To the trunco-conic element 15 is removably associated, by a bolt 16, a connection portion 17. The latter presents an annular shoulder 17a radially extending over elastic ring 7 and a threaded portion 17b disposed on the the opposite side with respect to the trunco-conic element 15.

After having described the above structure, the functioning of the spring will now be described.

When the spring is required to support a load, the connection tang 14 and the tubular body 2 approach one another while being opposed by the elastic ring 7.

For relatively light loads, the mutual approach between connection tang 14 and tubular body 2 is only opposed by the elastic reaction of first portion 7a, which is substantially deformed due to the shearing stresses. The second portion 7b does not flex at all under the load, as it is freely slidable along the inner cylindrical surface 5.

In such a situation, the static load variations sent to spring 1 will cause relative displacements between the connection tang 14 and the tubular body 2 of relatively high value. In other words, spring 1 will present a relatively low rigidity.

As load grows, a progressive approaching of rabbet edge 12 towards stopping seat 6 within tubular body 2 will occur. In this brief phase the spring rigidity remains almost constant until, when a predetermined load value is achieved, a mutual contact between rabbet edge 12 and stopping seat 6 occurs.

When reaching and exceeding said value, the load acting on spring 1 is also opposed by the consequent deformation of second portion 7b which is under shearing stress. The spring 1 rigidity appears therefore to be increased, as the loads that act on the spring are opposed by the elastic reactions exercised by the whole section of elastic ring 7. For this purpose, the rabbet edge must be sufficiently ridged that it is capable of being stopped by the stopping seat 6.

The strength of spring 1 is therefore subject to be further increased when, by a further increase of load acting on the spring, the checking surface 10 is put in contact with the contact seat 4, as clearly outlined in chain lines in the drawing. In such a situation, the mutual approach between connection tang 14 and tubular body 2 is also opposed by compression stresses induced in elastic ring 7 by the contact between contact seat 4 and the elastic ring 7.

The checking surface 10 and the contact seat 4 are shaped in order to enter in contact according to an area progressively growing with increased load. As a consequence of the above, said compression stresses, and consequently the rigidity of spring 1, are subject to grow progressively by the load increase acting on spring 1.

The invention aims are thus achieved. As a matter of fact, whereas known springs have a constant rigidity during a phase of shearing stress and a rigidity increase during a phase of shearing stress and compression, the present spring presents a first shearing stress value of constant rigidity, during a starting phase of shearing stress, a second value of constant rigidity, greater than the first value, during the second phase of shearing stress, and a further rigidity increase during the phase of shearing stress and compression.

It is also to be noted that, advantageously, the rigidity values of the spring according to the invention are substantially maintained less than the correspondent rigidity values of the known springs during the phases of shearing stress, in order to reach the same values of the traditional springs during shearing stress and compression working phases.

It is also understood that the above means a better behavior of the spring, particularly in functioning conditions comprising low and medium loads.

Obviously, the invention is susceptible of possible modifications and variations, without going beyond the inventive idea. More specifically, to satisfy particular requirements, it is also possible to foresee additional movable portions 7b separated by grooves 8 and interfering in succession with as many stoppings areas 6.

WHAT IS NEW AND DESIRED TO BE SECURED BY LETTERS PATENT OF THE UNITED STATES IS:

1. A variable strength spring comprising:
   a tubular body having an inside surface defining a concave, substantially continuously smooth contact seat coaxial to said tubular body;
   an elastic ring in said tubular body, said elastic ring having a checking surface facing said contact seat and a circumferential groove extending from an outer periphery of said ring towards the interior thereof, said groove being positioned along the length of said ring such that said groove longitudinally divides said ring into a first part located on a side of said groove opposite said contact seat, and a second part, wherein said first part is fixed to said tubular body and said second part includes said checking surface and is slidable relative to said tubular body;
   means defining a rigid rabbet edge movable with the outer periphery of said second portion, ;
   a connection tang rigidly connected to said elastic ring; and
   a stopping seat positioned in said tubular body such that said stopping seat is spaced from said rabbet edge when said spring is not subjected to a load, wherein said rabbet edge has such a rigidity that movement of said rabbet edge due to flexure of said elastic ring in response to a load on said spring is stopped by said stopping seat.

2. The spring of claim 1 wherein sectional areas of said first and second parts of said elastic ring are substantially equal.

3. The spring of claim 1 wherein said circumferential groove extends substantially radially of said elastic ring and by a depth of from 0.4 to 0.6 times the thickness of said ring at the longitudinal position of said groove.

4. The spring of claim 1 wherein said means defining a rabbet edge comprises a rigid annular element engaged to said second portion.

5. The spring of claim 4, including low friction material positioned between said annular element and said tubular body.

6. The spring of claim 1 including low friction material positioned between said second portion and said tubular body.

7. The spring of claim 1 wherein a fastening area between said elastic ring and said tubular body substantially equals a fastening area between said elastic ring and said tang.

* * * * *